United States Patent
Hsiao et al.

(10) Patent No.: US 8,994,912 B2
(45) Date of Patent: Mar. 31, 2015

(54) TRANSPARENT DISPLAY DEVICE

(71) Applicant: Shenzhen China Star Optoelectronics Technology Co., Ltd, Shenzhen (CN)

(72) Inventors: Chiachiang Hsiao, Shenzhen (CN); Chihwen Chen, Shenzhen (CN)

( * ) Notice: Subject to any disclaimer, the term of this patent is extended or adjusted under 35 U.S.C. 154(b) by 181 days.

(21) Appl. No.: 13/813,924

(22) PCT Filed: Jan. 9, 2013

(86) PCT No.: PCT/CN2013/070276
§ 371 (c)(1),
(2) Date: Feb. 1, 2013

(87) PCT Pub. No.: WO2014/107852
PCT Pub. Date: Jul. 17, 2014

(65) Prior Publication Data
US 2014/0192296 A1    Jul. 10, 2014

(30) Foreign Application Priority Data

Jan. 8, 2013    (CN) .......................... 2013 1 0006342

(51) Int. Cl.
*G02F 1/1335*    (2006.01)
*G02F 1/137*    (2006.01)

(52) U.S. Cl.
CPC ...... *G02F 1/133533* (2013.01); *G02F 1/13718* (2013.01)
USPC ............... 349/175; 349/96; 349/98; 349/119; 349/176

(58) Field of Classification Search
CPC .......... G02F 1/133533; G02F 1/13718; G02F 2001/133541; G02F 2001/133638
USPC ...................... 349/96, 98, 115, 117, 119, 176
See application file for complete search history.

(56) References Cited

U.S. PATENT DOCUMENTS

| | | | |
|---|---|---|---|
| 5,548,422 A | 8/1996 | Conner et al. | |
| 5,796,454 A * | 8/1998 | Ma | 349/98 |
| 6,300,929 B1 * | 10/2001 | Hisatake et al. | 345/94 |
| 2006/0109753 A1 * | 5/2006 | Fergason | 369/30.01 |
| 2006/0139539 A1 * | 6/2006 | Chen et al. | 349/129 |
| 2008/0018833 A1 * | 1/2008 | Ma | 349/98 |
| 2011/0193874 A1 * | 8/2011 | Jung et al. | 345/589 |

FOREIGN PATENT DOCUMENTS

| | | |
|---|---|---|
| CN | 1510478 A | 7/2004 |
| CN | 102629014 A | 8/2012 |
| CN | 102789093 A | 11/2012 |

OTHER PUBLICATIONS

Computer translation of CN 1510478 , Jul. 2004, pp. 1-14.*
Wang Chao, the International Searching Authority written comments, Oct. 2013, CN.

* cited by examiner

*Primary Examiner* — Dung Nguyen
*Assistant Examiner* — Tai Duong

(57) ABSTRACT

A transparent display device includes a cholesteric liquid crystal display (LCD) panel to display an image, a first polarized sheet arranged on one side of the cholesteric LCD panel, and a first ¼ phase delay sheet arranged between the first polarized sheet and the display panel.

9 Claims, 7 Drawing Sheets

<Prior Art>

US 8,994,912 B2

TRANSPARENT DISPLAY DEVICE

TECHNICAL FIELD

The present disclosure relates to the field of display devices, and more particularly to a transparent display device.

BACKGROUND

Due to special optical characteristics of cholesteric liquid crystals (LCs), cholesteric liquid crystals can be used to manufacture a reflective liquid crystal display (LCD) device. As shown in FIG. 10, directors of the cholesteric liquid crystals are distributed helically due to the different directors of layers of the cholesteric liquid crystals. Thickness of an LC molecular layer required by rotation of the directors by 360 degrees is known as an optical rotatory thickness (pitch). Right-hand optical rotatory cholesteric LCs reflect left-hand circularly polarized light and pierce through right-hand circularly polarized light, so that the reflected light is still the left-hand circularly polarized light. Left-hand optical rotatory cholesteric LCs reflect the right-hand circularly polarized light and pierce through the left-hand circularly polarized light so that the reflected light is still the right-hand circularly polarized light.

As shown in FIG. 11 and FIG. 12, the cholesteric LCs generally used in manufacture of the reflective LCD device. There are mainly two working patterns: one is the LC molecules are kept in a reflective state of a planar structure, and the second is the LC molecules are kept in a scattering state of a focal conic structure. The two states can be realized by applying voltage on both sides of the LC layer to form a control switch to control the reflective state and the scattering state of the cholesteric LCs.

The cholesteric LCD device also mainly has two structures. FIG. 11 shows a first structure: red (R), green (G), and blue (B) cholesteric LCs are used and made into picture elements in a panel 20 (cell). A black absorption layer 21 is arranged below the panel. When the cholesteric LCD device displays white, R, G, and B cholesteric LCs all reflect corresponding colors. When the cholesteric LCD device displays colors the color (e.g. red) to be displayed is reflected, and other colors (e.g. green and blue) are pierce through the color (e.g. red) that is displayed. When the cholesteric LCD device displays black, R, G, and B picture elements do not reflect, and all light is absorbed by the black absorption layer 21. FIG. 12 shows a second structure: three layers of the panels 20 (cell) are manufactured. Each of the layers of the panel 20 is made with cholesteric LCs that controls three colors (R, G, and B). A black absorption layer 21 is arranged below the panel 20. When the cholesteric LCD device displays the white, R, G, and B cholesteric LCs all reflect corresponding colors. When the cholesteric LCD device displays the colors, the color (e.g. red) to be displayed is reflected, and other colors (e.g. green and blue) are pierce through the color (e.g. red) that is displayed. When the cholesteric LCD device displays the black, R, G, and B picture elements do not reflect, and all light is absorbed by the black absorption layer 21.

SUMMARY

In view of the above-described problems, the aim of the present disclosure is to provide a transparent display device where objects behind the display device can be seen.

The purpose of the present disclosure is achieved by the following technical scheme: a transparent display device comprises a cholesteric liquid crystal display (LCD) panel that displays an image, a first polarized sheet arranged on one side of the cholesteric LCD panel a second polarized sheet arranged on the another side of the cholesteric LCD panel, a first ¼ phase delay sheet arranged between the first polarized sheet and the display panel, a second ¼ phase delay sheet arranged between the second polarized sheet and the display panel, and a ½ phase-difference LC layer arranged between the second phase delay sheet and the display panel and configured with a diverter switch that switches between a ½ phase delay state and a no-phase delay state. The cholesteric LCD panel is a multicolor liquid crystal display (LCD) panel. The cholesteric LCD panel comprises a LC panel. Red, green and blue cholesteric LC picture elements are used in the LCD panel.

The purpose of the present disclosure can also be achieved by the following technical scheme: a transparent display device comprises a cholesteric LCD panel that displays an image, a first polarized sheet arranged on one side of the cholesteric LCD display panels and a first ¼ phase delay sheet arranged between the first polarized sheet and the display panel.

In one example, another side of the cholesteric LCD panel is configured with a second polarized sheet and a second ¼ phase delay sheet. The second ¼ phase delay sheet is arranged between the cholesteric LCD panel and the second polarized sheet. An included angle between the polarized direction of the first polarized sheet and the polarized direction of the second polarized sheet is 90 degrees. A bidirectional transparency of the display device is realized by installing the phase delay sheet and the polaroid on both sides.

In one example, a ½ phase delay device is also arranged between the second polarized sheet and the cholesteric LCD panel. The ½ phase delay device is configured with a diverter switch that switches between a ½ phase delay state and a no-phase delay state. The phase of the circularly polarized light is regulated by using the ½ phase delay device, so that the light is absorbed by the polaroid and the transparent display device is switched to an opaque state.

In one example, the ½ phase delay device is arranged between the second ¼ phase delay sheet and the cholesteric LCD panel.

In one example, the ½ phase delay device is arranged between the second ¼ phase delay sheet and the second polarized sheet.

In one example, the ½ phase delay device comprises a ½ phase difference LC layer. The diverter switch is a driving switch that controls the LC deflection of the LC layer. The phase difference state and the no-phase difference state can be easily regulated by using the deflection of LCs.

In one example, the cholesteric LCD panel is a monochromatic LCD panel. The color of the display panel can be set.

In one example, the cholesteric LCD panel is a multicolor LCD panel. A real image can be reflected by color display.

In one example, the cholesteric LCD panel comprises a LC panel. Red, green and blue cholesteric LC picture elements are used in the LC panel.

In one example, the cholesteric LCD panel comprises three LC panels made with red, green and blue cholesteric LCs.

In the present disclosure, as the polaroid and the ¼ phase delay sheet are used on one side of the cholesteric LCD panel, an incident ray is changed into the left-hand circularly polarized light or the right-hand circularly polarized light, so that the left-hand circularly polarized light can pass through the left rotatory cholesteric LCs, or the right-hand circularly polarized light can pass through the right rotatory cholesteric LCs. Thus, the light ray reflected from an object on one side of the display device can pierce through the display device, and an observer at another side of the display device can see the image of the object, thus achieving transparency of the display device.

Legends: 10. cholesteric LCD panel; 11. ½ phase difference LC layer (½ phase delay device); 12. second ¼ phase delay sheet; 13. second polarized sheet; 14. first ¼ phase delay sheet; 15. first polarized sheet; 20. panel (cell); 21. black absorption layer.

DETAILED DESCRIPTION

The present disclosure provides a transparent display device. An observer can see an object from one side from other side of the transparent display device. The technical scheme of the present disclosure is further described in detail in accordance with the specific examples.

EXAMPLE 1

Figure 1:
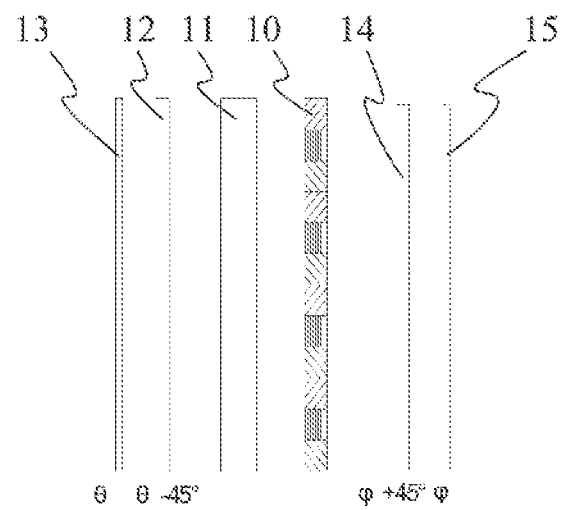
FIG. 1 is a structural diagram of a transparent display device of a first example of the present disclosure.

As shown in FIG. 1, the transparent display device comprises a cholesteric liquid crystal display (LCD) panel 10 internally configured with cholesteric LCs, a control switch (not shown in the figure) to control a reflective state and a scattering state of the cholesteric LCs in the cholesteric LCD panel 10, a first polarized sheet 15 arranged on one side of the cholesteric LCD panel 10, a first ¼ phase delay sheet 14 arranged between the first polarized sheet 15 and the cholesteric LCD panel 10, a second polarized sheet 13 arranged on the other side of the cholesteric LCD panel 10, a second ¼ phase delay sheet 12 arranged between the second polarized sheet 13 and the cholesteric LCD panel 10, and a ½ phase delay device 11 arranged between the second ¼ phase delay sheet 12 and the cholesteric LCD panel 10. The ½ phase delay device 11 is configured with a phase delay state switching module (not shown in the figure) to switch the ½ phase delay state and no-phase delay state. A polarized angle of the first polarized sheet 15 is phi (φ) and a polarized angle of the second polarized sheet 13 is theta (θ), where |theta−phi|=90 degrees, namely the polarized angle between the first polarized sheet 15 and the second polarized sheet 13 is 90 degrees. An optical angle of the first phase delay sheet 14 is phi+45 degrees, and an optical angle of the second phase delay sheet is theta−45 degrees.

Figure 1A:
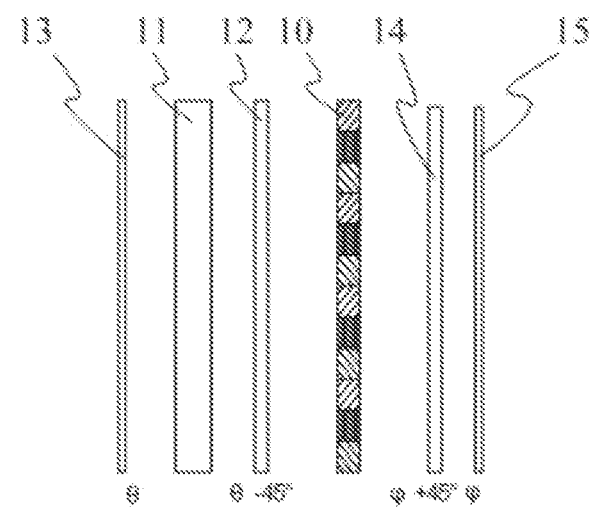
FIG. 1a is a structural diagram of a transparent display of a varied example of the disclosure.

The ½ phase delay device 11 can be arranged between the second polarized sheet 13 and the second ¼ phase delay sheet 12 (see FIG. 1a) or between the second ¼ phase delay sheet 12 and the cholesteric LCD panel 10 (see FIG. 1).

In the example, the cholesteric LCs in the cholesteric LCD panel 10 are left-hand optical rotatory left rotatory cholesteric LCs or right-hand optical rotatory right rotatory cholesteric LCs. If the cholesteric LCs are the right rotatory cholesteric LCs, different phase delay sheets are arranged. The ½ phase delay device 11 is a ½ phase difference LC layer 11 to regulate the phase delay state and the no-phase delay state. Both sides of the ½ phase difference LC layer 11 are both configured with electrodes, a driving circuit that drives a motor, and a corresponding driving switch. The driving switch drives the electrodes on both sides of the ½ phase difference LC layer 11 to realize deflection of LCs, thus realizing switching of the ½ phase delay function or the no-phase delay function of a transmitted light ray.

Figure 11:
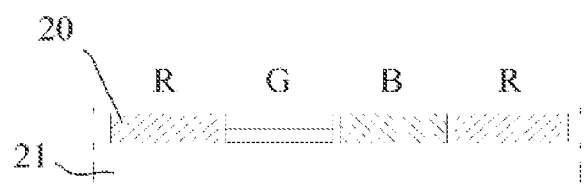
FIG. 11 is a structural diagram of a typical reflective cholesteric liquid crystal display (LCD) device.
Figure 12:
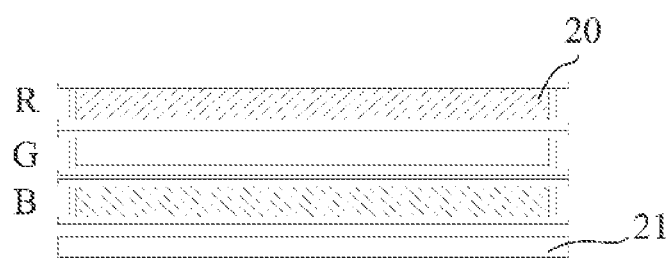
FIG. 12 is a structural diagram of another typical reflective cholesteric liquid crystal display (LCD) device.

In the example, the cholesteric LCD panel 10 is a color LCD panel. The structure of the cholesteric LCD panel 10 may be that red (R), green (G), and blue (B) cholesteric LCs are used in a panel 20 (cell) as shown in FIG. 11, or as shown in FIG. 12: three panels (cell) 20 are arranged and different colors of LCs are used into three panels 20 (cell). If the cholesteric LCD panel 10 does not need to display color, the cholesteric LCD panel 10 can also be manufactured into a monochromatic LCD panel.

Figure 2:
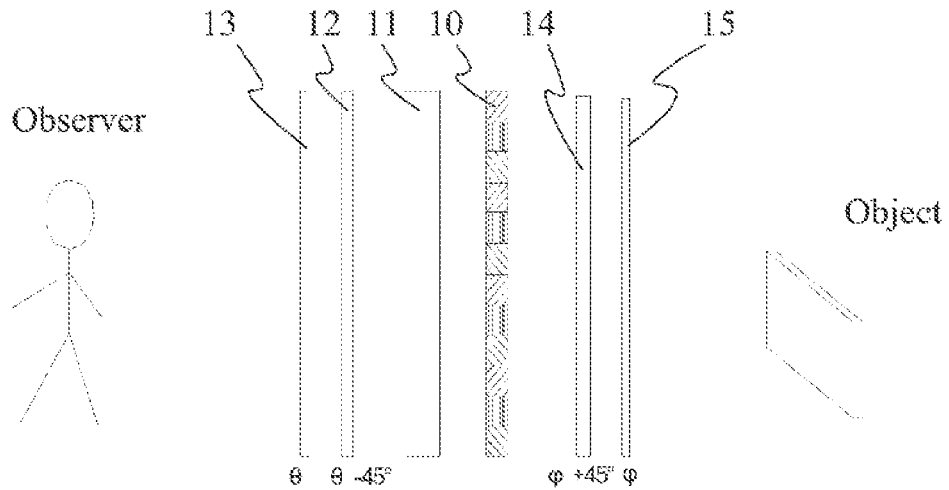
FIG. 2 is an azimuth diagram of an observer of the first example of the present disclosure.

The above example is the structure of the transparent display device. As shown in FIG. 2, a display surface of the transparent display device configured with the transparent display device in the example is configured with the ½ phase difference LC layer 11, the observer sees an image from the direction of the display surface. By controlling voltage on both sides of the LCs of the cholesteric LCD panel 10 and the ½ phase difference LC layer 11, the transparent display device of the example respectively realizes: a piercing mode (transparent), a semi-piercing mode (subtransparent), and a non-piercing mode (opaque) that are described by figures.

The piercing mode: no voltage is applied to the cholesteric LCD panel 10 or the ½ phase difference LC layer.

Figure 3:
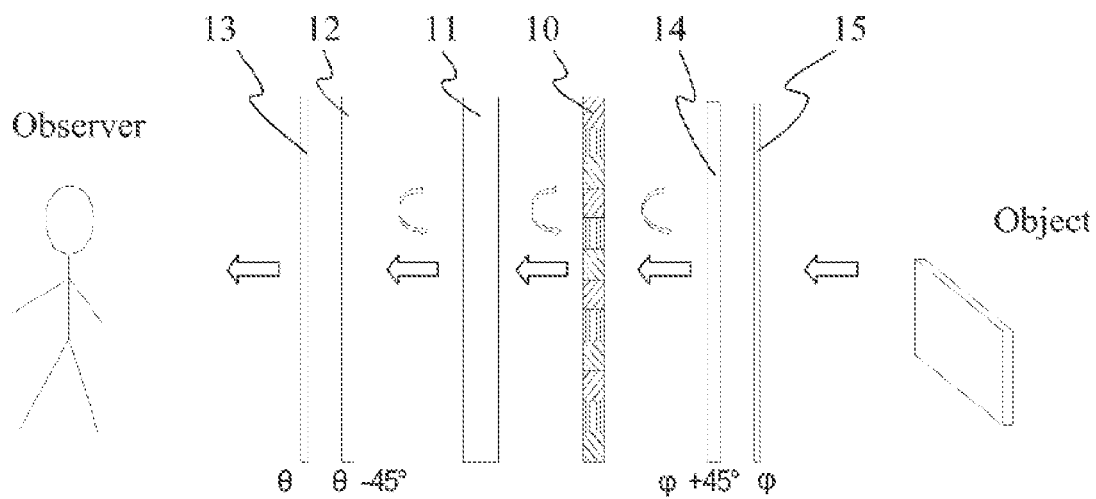
FIG. 3 is a schematic diagram of a piercing mode 1 of the first example of the present disclosure.

As shown in FIG. 3, on the basis of a sequence that the light passes through components:

A. the light from the object side passes through the first polarized sheet 15 and the first ¼ phase delay sheet 14 to form right-hand circularly polarized light.

B. the cholesteric LCs in the cholesteric LCD panel 10 are operated in the focal conic state. At this moment, the LC layer is in the scattering state. The right-hand circularly polarized light pierces through the left rotatory cholesteric LCs and is continuously kept as the right-hand circularly polarized light.

C. the ½ phase difference LC layer 11 is driven to the no-phase difference state. After piercing through the ½ phase difference LC layer 11, the right-hand circularly polarized light is constant.

D. after the right-hand circularly polarized light passes through the second ¼ phase delay sheet 12 and the second polarized sheet 13, the right-hand circularly polarized light becomes linearly polarized light to reach human eyes. At this moment, the observer can see the image behind the display.

Figure 4:
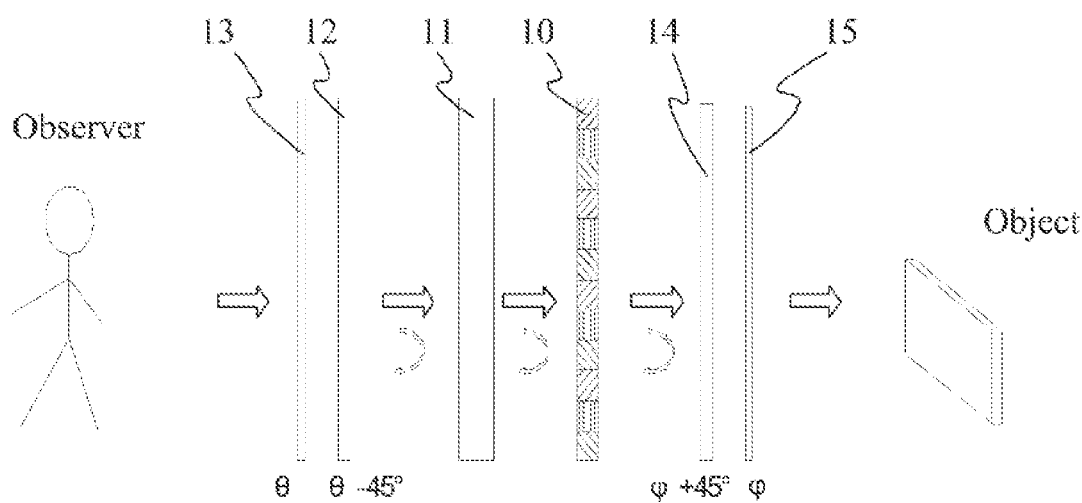
FIG. 4 is a schematic diagram of a piercing mode 2 of the first example of the present disclosure.

As shown in FIG. 4, on the basis of the sequence that the light passes through the components:

A. the light from the observer side passes through the second polarized sheet 13 and the second ¼ phase delay sheet 12 to form the left-hand circularly polarized light.

B. the ½ phase difference LC layer 11 is driven to the no-phase difference state. After the left-hand circularly polarized light pierces through the ½ phase difference LC layer 11, the left-hand circularly polarized light is constant.

C. the cholesteric LCs in the cholesteric LCD panel 10 are operated in the focal conic state. At this moment, the LC layer is in the scattering state. The left-hand circularly polarized light pierces through the left rotatory cholesteric LCs and is continuously kept as the left-hand circularly polarized light.

D. after the left-hand circularly polarized light passes through the first ¼ phase delay sheet 14 and the first polarized sheet 15, the left-hand circularly polarized light becomes linearly polarized light to reach human eyes. At this moment, incident light from the direction of the observer passes through the display without reflection, and does not reduce contrast of the image at the object side.

FIG. 3 and FIG 4 show that the transparent display device of the present disclosure can be regulated to be bidirectional transparent. The image of the object on the other side can be seen on both sides of the transparent display device.

The semi-piercing mode: voltage is applied to some picture elements of the cholesteric LCD panel 10, and no voltage is applied to some picture elements. No voltage is applied to the ½ phase difference LC layer 11.

Figure 5:
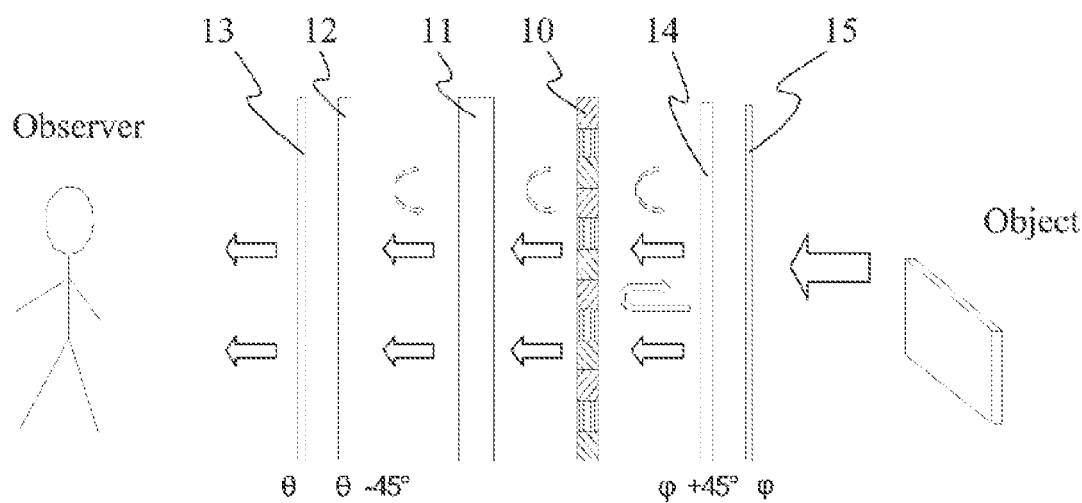
FIG. 5 is a schematic diagram of a semi-piercing mode 1 of the first example of the present disclosure.

As shown in FIG. 5, on the basis of the sequence that the light passes through components:

A. the light from the object side passes through the first polarized sheet 15 and the first ¼ phase delay sheet 14 to form the right-hand circularly polarized light.

B. the cholesteric LCs in the cholesteric LCD panel 10 are partially operated in the focal conic state and in the reflective state of the planar structure, namely partial LCs are in the scattering state and other LCs are in the reflective state. At this moment, the right-hand circularly polarized light pierces through the left rotatory cholesteric LCs in the scattering state and is continuously kept as the right-hand circularly polarized light. However, for the picture elements in the reflective state, the right-hand circularly polarized light is reflected. At this moment the color displayed by the display is a complementary color of the reflective state.

C. The ½ phase difference LC layer 11 is driven to a no-phase difference state. After the right-hand circularly polarized light pierces through the ½ phase difference LC layer 11, the right-hand circularly polarized light is constant.

D. After the right-hand circularly polarized light passes through the first ¼ phase delay sheet 12 and the first polarized sheet 13, the right-hand circularly polarized light becomes linearly polarized light to reach human eyes.

Figure 6:
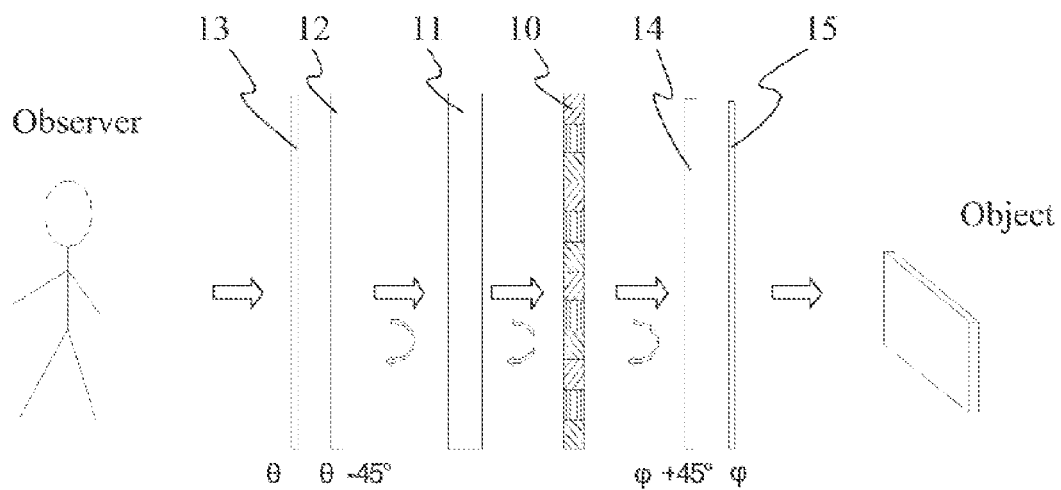
FIG. 6 is a schematic diagram of a semi-piercing mode 2 of the first example of the present disclosure.

As shown in FIG. 6, on the basis of the sequence that the light passes through the components:

A. the light from the observer side passes through the first polarized sheet 13 and the first ¼ phase delay sheet 12 to form the left-hand circularly polarized light.

B. the ½ phase difference LC layer 11 is driven to a no-phase difference state. After the left-hand circularly polarized light pierces through the ½ phase difference LC layer 11, the left-hand circularly polarized light is constant.

C. at this moment, the left-hand circularly polarized light pierces through the cholesteric LCD panel 10 internally configured with the left rotatory cholesteric LCs without reflection, and is continuously kept as the left-hand circularly polarized light.

D. after the left-hand circularly polarized light passes through the first ¼ phase delay sheet 14 and the first polarized sheet 15, the left-hand circularly polarized light becomes linearly polarized light to reach human eyes. At this moment, the incident light from the direction of the observer passes through the display without reflection, and does not reduce the contrast of the image at the object side.

FIG. 5 and FIG. 6 show that the transparent display device of the present disclosure can be regulated to be bidirectional subtransparent. The image of the object on the other side can be seen on both sides of the display device.

The non-piercing mode: Voltage is applied to partial picture elements of the cholesteric LCD panel 10, and no voltage is applied to partial picture elements. Voltage is applied to the ½ phase difference LC layer 11.

Figure 7:
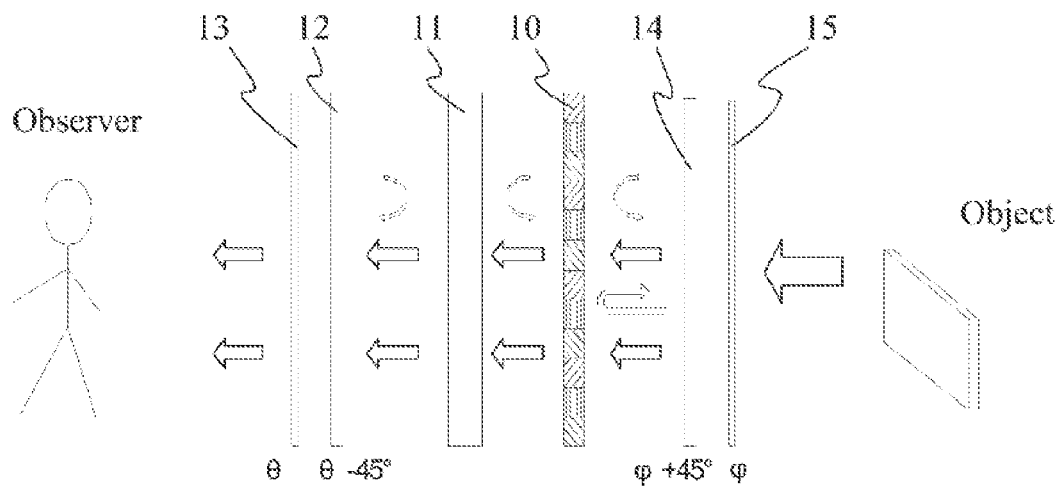
FIG. 7 is a schematic diagram of a non-piercing mode 1 of the first example of the present disclosure.

As shown in FIG. 7, on the basis of the sequence that the light passes through the components:

A. the light from the object side passes through the first polarized sheet 15 and the first ¼ phase delay sheet 14 to form the right-hand circularly polarized light.

B. the cholesteric LCs in the cholesteric LCD panel 10 are operated in the scattering state of the focal conic structure and the reflective state of the planar structure. At this moment, the right-hand circularly polarized light pierces through the left rotatory cholesteric LC picture elements in the scattering state and is continuously kept as the right-hand circularly polarized light. However, for the picture elements in the reflective state, the right-hand circularly polarized light is reflected. At this moment, the color displayed by the display is a complementary color of the reflective state.

C. the ½ phase difference LC layer is driven to a ½ phase difference stale. After the right-hand circularly polarized light pierces through the switchable ½ phase difference LC layer, the right-hand circularly polarized light becomes the left-hand circularly polarized light.

D. after the left-hand circularly polarized light passes through the second ¼ phase delay sheet 12 and the second polarized sheet 13, the left-hand circularly polarized light is absorbed by the polaroid. Namely, the image of the object on the other side of the display device may not be seen by human eyes.

Figure 8:
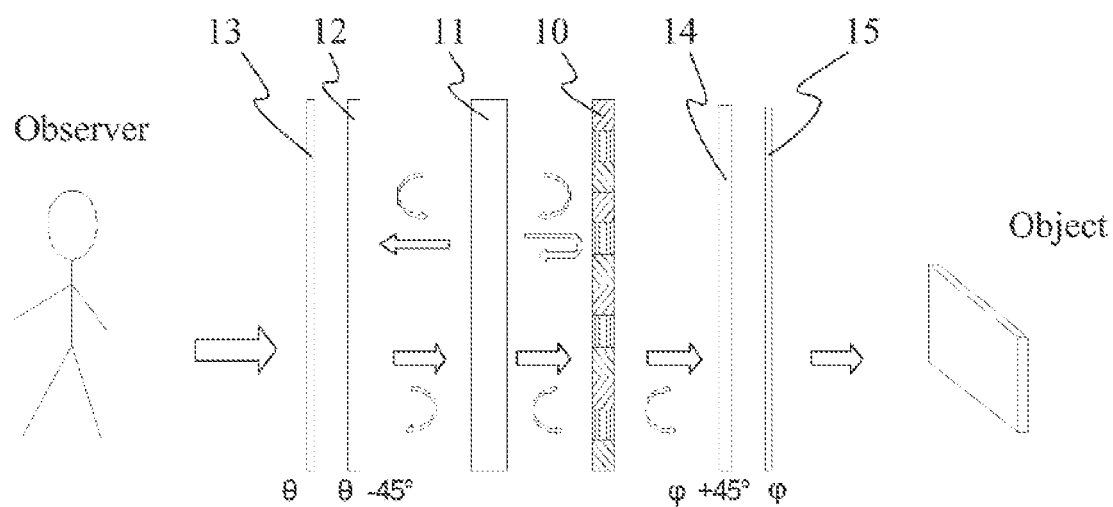
FIG. 8 is a schematic diagram of a non-piercing mode 2 of the first example of the present disclosure.

As shown in FIG. 8, on the basis of the sequence that the light passes through the components:

A. the light from the observer side passes through the second polarized sheet 13 and the second ¼ phase delay sheet 12 to form the left-hand circularly polarized light.

B. The ½ phase difference LC layer 11 is driven to the ½ phase difference state. After the left-hand circularly polarized light passes through the ½ phase difference LC layer 11, the left-hand circularly polarized light becomes the right-hand circularly polarized light.

C. when the LCs in the cholesteric LCD panel 10 are operated in the scattering state of the focal conic structure, the right-hand circularly polarized light pierces through the left rotatory cholesteric LC layer. After the right-hand circularly polarized light passes through the first ¼ phase delay sheet 14, the right-hand circularly polarized light is absorbed by the first polarized sheet 15. When the cholesteric LCs are operated in the reflective state of the planar structure, the right-hand circularly polarized light is reflected by the left rotatory cholesteric but is kept. After the reflected right-hand circularly polarized light pierces through the ½ phase difference LC layer 11, the reflected right-hand circularly polarized light becomes the left-hand circularly polarized light.

D. After the left-hand circularly polarized light passes through the second ¼ phase delay sheet 12, the left-hand circularly polarized light is absorbed by the second polarized sheet 13.

FIG. 7 and FIG. 8 show that the transparent display device of the present disclosure can be regulated to be non-subtransparent. The image of the object on the other side may not be seen on both sides of the display device. At this moment, the incident light from the direction of the observer passes through the display without reflection, and does not reduce contrast.

The above contents describe the structure and the working pattern of the example 1.

EXAMPLE 2

Figure 9:
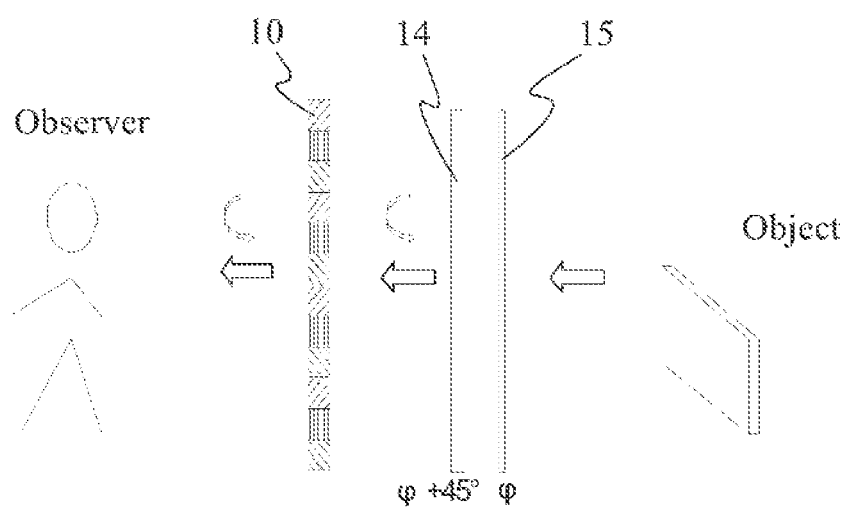
FIG. 9 is a structural diagram of a transparent display device of a second example of the present disclosure.
Figure 10:
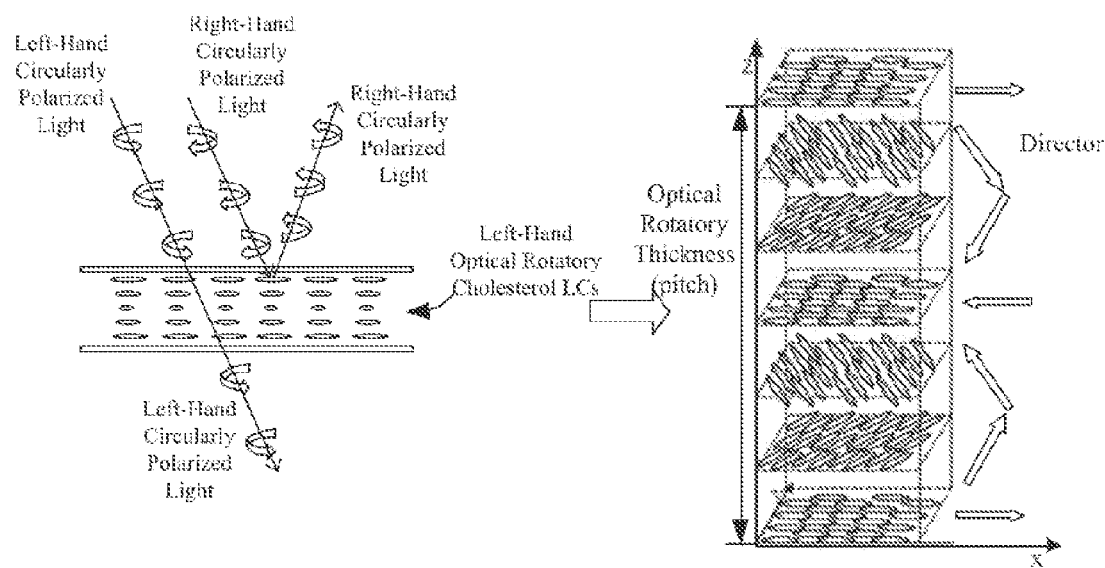
FIG. 10 is a schematic diagram of feature description of cholesteric liquid crystals.

As shown in FIG. 9, the transparent display device comprises the cholesteric LCD panel 10 internally configured with right rotatory cholesteric LCs, a control switch (not shown in the figure) that controls the reflective state and the scattering state of the cholesteric LCs in the cholesteric LCD panel 10, the first polarized sheet 15 arranged on one side of the cholesteric LCD panel 10, and the first ¼ phase delay sheet 14 arranged between the first polarized sheet 15 and the cholesteric LCD panel 10. The transparent display device of the example realizes a unidirectional transparent mode, namely the object on the other side of the transparent display device can be seen from one side of the observer, and the image of the object on one side of the observer may not be seen from the other side of the display device.

As shown in FIG. 9, after the light from the object side passes through the first polarized sheet 15 and the first phase delay sheet 14, the light becomes the right-hand circularly polarized light. The right-hand circularly polarized light can pass through the right rotatory cholesteric LCs (at this moment, the right rotatory cholesteric LCs are operated in the reflective state). That is to say, the light rays from the object side can pierce through the cholesteric LCD panel 10 internally configured with the right rotatory cholesteric LCs to reach human eyes. Then, the unidirectional transparent state is formed. The other side of the transparent display device can be seen from one side of the observer by human eyes (i.e. one side of the object shown in the figure). However, the image of one side of the observer may not be seen from one side of the object.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A transparent display device, comprising:
    a cholesteric liquid crystal display (LCD) panel that displays an image;
    a first polarized sheet arranged on one side of the cholesteric LCD panel; and
    a first ¼ phase delay sheet arranged between the first polarized sheet and the display panel,
    wherein another side of the cholesteric liquid crystal display (LCD) panel is configured with a second polarized sheet and a second ¼ phase delay sheet; the second ¼ phase delay sheet is arranged between the cholesteric LCD panel and the second polarized sheet; an included angle between a polarized direction of the first polarized sheet and a polarized direction of the second polarized sheet is 90 degrees,
    wherein a ½ phase delay device is arranged between the second polarized sheet and the cholesteric LCD panel; the ½ phase delay device is configured with a diverter switch that switches between a ½ phase delay state and a no-phase delay state.

2. The transparent display device of claim 1, wherein the ½ phase delay device is arranged between the second ¼ phase delay sheet and the cholesteric LCD panel.

3. The transparent display device of claim 1, wherein the ½ phase delay device is arranged between the second ¼ phase delay sheet and the second polarized sheet.

4. The transparent display device of claim 1, wherein the ½ phase delay device is a ½ phase difference LC layer; the diverter switch is a driving switch that controls an LC deflection of the ½ phase difference LC layer.

5. The transparent display device of claim 1, wherein the cholesteric LCD panel is a monochromatic LCD panel.

6. The transparent, display device of claim 1, wherein the cholesteric LCD panel is a multicolor LCD panel.

7. The transparent display device of claim 1, wherein cholesteric liquid crystal display (LCD) panel comprises a LC panel; wherein red, green and blue cholesteric LC picture elements are used in the LC panel.

8. The transparent display device of claim 1, wherein the cholesteric LCD panel comprises three LC panels made with red, green and blue cholesteric LCs, respectively.

9. A transparent display device, comprising;
    a cholesteric liquid crystal display (LCD) panel that displays an image;
    a first polarized sheet arranged on one side of the cholesteric LCD panel;
    a second polarized sheet arranged on another side of the cholesteric LC display panel;
    a first ¼ phase delay sheet arranged between the first polarized sheet and the display panel;
    a second ¼ phase delay sheet arranged between the second polarized sheet and the display panel; and
    a ½ phase-difference LC layer arranged between the second phase delay sheet and the display panel; wherein the ½ phase-difference LC layer configured with a diverter switch that switches between a ½ phase delay state and a no-phase delay state;
    wherein the cholesteric LCD panel is a multicolor LCD panel; the cholesteric LCD panel comprises a LC panel, wherein red, green and blue cholesteric LC picture elements are used in the LC panel.

* * * * *